US005712325A

United States Patent [19]
Lewis et al.

[11] Patent Number: 5,712,325
[45] Date of Patent: Jan. 27, 1998

[54] METHOD FOR MAKING RADIATION CURABLE SILICON CONTAINING POLYACRYLATE HARDCOAT

[75] Inventors: Larry Neil Lewis, Scotia; Gautam Ambalal Patel; Gregory Ronald Gillette, both of Clifton Park; George Fredric Medford, Ballston Lake, all of N.Y.

[73] Assignee: General Electric Company, Schenectady, N.Y.

[21] Appl. No.: 816,602

[22] Filed: Mar. 13, 1997

Related U.S. Application Data

[63] Continuation of Ser. No. 578,790, Dec. 26, 1995, abandoned, which is a continuation of Ser. No. 304,298, Sep. 12, 1994, abandoned.

[51] Int. Cl.[6] ............................. C08J 3/09; C08K 3/36; C08L 83/07
[52] U.S. Cl. ............................. 522/83; 522/84; 522/99; 522/172; 528/26; 528/29; 528/32; 528/20; 428/412
[58] Field of Search .......................... 522/83, 84, 99, 522/172; 528/26, 29, 32, 20

[56] References Cited

U.S. PATENT DOCUMENTS

| | | |
|---|---|---|
| 3,258,477 | 6/1966 | Plueddemann et al. |
| 4,021,310 | 5/1977 | Shimizu et al. |
| 4,385,153 | 5/1983 | Ritter. |
| 4,486,504 | 12/1984 | Chung ............................ 428/412 |
| 4,491,508 | 1/1985 | Olson et al. ..................... 522/77 |
| 4,709,067 | 11/1987 | Chu et al. |
| 5,214,085 | 5/1993 | Patel et al. ..................... 522/83 |

FOREIGN PATENT DOCUMENTS

| | | |
|---|---|---|
| 0 408 047 | 1/1991 | European Pat. Off. |
| 505737 | 2/1992 | European Pat. Off. |
| 2089826 | 6/1982 | United Kingdom. |
| 2278610 | 5/1994 | United Kingdom. |

OTHER PUBLICATIONS

E.G. Janzen, Spin Trapping, Chem. Eng. News 43, 50 (Sep. 27, 1965), Amer. Chem. Soc. (pp.31–40).
I.H. Leaver et al., E.S.R. of Nitroxide Radicals, Aust. J. Chem. 1969, (pp.1891–1900).
J.C. Bevington and N.A. Ghanem, The Mechanisms of Inhibition and Retardation in Radical Polymerizations. Part III, The Use of a Stable Free Radical as an Inhibitor, J. of Polymer Science, 1956, (pp. 3506, 3507 and 3509).
C.Anderson Evans, Spin Trapping, Aldrichimica Acta. vol. 12, No. 2, 1979 (pp.23,25,26–29).
J.F. Areizaga et al., Galvinoxyl As Scavenger in the Radical Polymerization of Styrene Initiated by AIBN, Makromol.Chem.Macromol.Symp. 20/21, 1988 (pp.77, 79–82).
S.F. Nelson, Azocumene. I. Preparation and Decomposition of Azocumene. Unsymmetrical Coupling Products of the Cumyl Radical, J. Am. Chem. Soc., 1965, (pp.137–142).
L.N. Lewis et al., Ultraviolet–Curable, Abrasion–Resistant, and Weatherable Coatings with Improved Adhesion, J. of Applied Polymer Sicence, vol. 42, 1991, (pp.1551–1556).
M. Stickler, Experimental Techniques in Free Radical Polymerization Kinetics, Makromol Chem. Macromol. Symp. 10/11, 1987, (pp.17–69).

*Primary Examiner*—Susan W. Berman
*Attorney, Agent, or Firm*—William H. Pittman

[57] ABSTRACT

A method is provided for making a radiation curable silicon containing polyacrylate hardcoat composition based on the use of a dispersion of colloidal silica in a C(3-5) branched aliphatic alcohol such as isopropyl alcohol. A reduction in the use of excess amounts of solvent along with avoiding gelation is achieved while allowing treatment of the colloidal silica dispersion with a alkoxysilylacrylate, followed by the employment of polyfunctional reactive acrylic monomer and stripping of the mixture.

9 Claims, No Drawings

METHOD FOR MAKING RADIATION CURABLE SILICON CONTAINING POLYACRYLATE HARDCOAT

This application is a Continuation of application Ser. No. 08/578,790 filed Dec. 26, 1995, now abandoned, which is a Continuation of application Ser. No. 08/304,298, filed Sep. 12, 1994, now abandoned.

BACKGROUND OF THE INVENTION

The present invention relates to a method for making radiation curable silicon containing polyacrylate hardcoat compositions. A dispersion of colloidal silica in a branched aliphatic alcohol is treated with an alkoxysilylacrylate. Reactive polyfunctional acrylate, is thereafter incorporated into the resulting mixture, followed by the stripping of the branched aliphatic alcohol therefrom.

As shown by Olson et al., U.S. Pat. No. 4,491,508, a solventless radiation curable silicon containing polyacrylate hardcoat composition can be made by agitating a mixture of a water miscible alcohol, an aqueous colloidal silica dispersion, and a alkoxysilylacrylate followed by the addition of reactive acrylic monomer. The resulting mixture is then stripped of volatiles. Water removal is effected by azeotropic distillation using an excess of a water miscible organic alcohol.

As used hereinafter, the expression "radiation curable" means cure resulting from actinic radiation such as UV light, or particle radiation such as electron beam.

Experience has shown that in the synthesis of materials requiring a distillation step, it is often preferred to have a favorable liquid material balance, or "kettle yield". The kettle yield "Q" can be expressed as follows:

$$Q = \frac{FW}{IW} \times 100$$

where "IW" is initial weight, of the reaction mixture, and "FW" is the final weight of the resulting stripped reaction product. Q can have a value in the range of about 5 to about 60%. A favorable kettle yield has a value of from about 30 to about 60%. An unfavorable kettle yield has a Q value of from about 5% to about 30%. An unfavorable kettle yield results when the amount of liquid initially used is considerably greater than the amount of liquid remaining after the product is recovered. A process requiring excess water removal such as by azeotropic distillation is often a cause of an unfavorable kettle yield.

It would be desireable therefore to be able to make a curable silicon containing polyacrylate hardcoat composition without the initial use of an aqueous dispersion of colloidal silica. However, it has been found that the employment of an alkoxysilylacrylate in a methanolic dispersion of colloidal silica particularly when further used in combination with a polyfunctional acrylate, can result in a gelled mixture.

SUMMARY OF THE INVENTION

The present invention is based on the discovery that although the addition of an alkoxysilylacrylate into a dispersion of colloidal silica in certain water miscible straight chain alcohols, such as methanol, can produce gelation, the use of an alkoxysilylacrylate in a dispersion of colloidal silica in a water miscible C(3-5) branched alcohol, or a dispersion of colloidal silica in a water miscible straight chain alcohol having at least 20% by weight of a branched C(3-5) water miscible alcohol, has been found to be effective for making substantially gel free curable silicon containing polyacrylate hardcoat compositions. In addition, a satisfactory kettle yield is also realized, since the alcoholic colloidal silica organosol can achieve effective results with from about 0.5 to about 5% by weight water. In instances where the water content of the water miscible alcohol is insufficient to allow for alkoxysilylacrylate hydrolysis, sufficient water can be added.

Some of the C(3-5) branched aliphatic alcohols which can be used in the practice of the method of the present invention to form the curable silicon containing polyacrylate hardcoat compositions are selected from a member of the group consisting of,

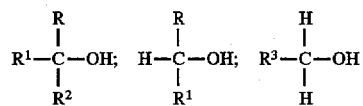

where R, $R^1$ and $R^2$ can be the same or different and are members selected from the group consisting of $C_{(1-2)}$ alkyl radicals, and $R^3$ is a tertiary butyl radical.

STATEMENT OF THE INVENTION

There is provided by the present invention, a method for making a curable silicon containing polyacrylate hardcoat composition comprising, effecting the substantial removal of volatiles at a temperature of 25° C. to 100° C. and 1 torr to 760 torr pressure from a silicon containing polyacrylate mixture comprising by weight, (A) 100 parts of the product of reaction at a temperature of about 20° C. to about 100° C. of a mixture of (i) about 5% to about 20% by weight of alkoxysilylacrylate, and (ii) correspondingly about 80% to about 95% by weight of a colloidal silica alcoholic dispersion consisting essentially of colloidal silica in a C(3-5) branched aliphatic alcohol, or a mixture of a C(3-5) branched aliphatic alcohol and a C(1-5) straight chain alcohol, where the colloidal silica is present in the colloidal silica alcoholic dispersion at from about 5% to about 70% by weight, (B) about 10 to about 400 parts of at least one polyfunctional reactive acrylic monomer and, (C) an effective amount of gelation inhibitor, where there is present in the colloidal silica alcoholic dispersion sufficient water to effect the hydrolysis of the alkoxysilylacrylate.

Some of the preferred $C_{(3-5)}$ branched water miscible alcohols which can be used in the practice of the invention are isopropanol, isobutanol, tertbutanol, and neopentanol.

The gelation inhibitors which can be used in the practice of the invention include aerobic and anaerobic gelation inhibitors. The preferred aerobic inhibitor is methylhydroquinone.

Among the anaerobic gelation inhibitors which can be used in the practice of the invention, there are included, 2,2,6,6-tetramethylpiperidinyloxy(TEMPO), 4-hydroxy-2,2,6,6-tetramethylpiperidinyloxy(4—OH TEMPO), galvinoxyl, 2,2-diphenyl-1-picryl-hydrazyl hydrate, Banfield's radical, 1,3,5-triphenyl verdazyl, Koelsch's radical 1-nitroso-2-naphthol and bis(2,2,6,6-tetramethyl-4-piperidinyloxy)sebacate.

An effective amount of aerobic or anaerobic gelation inhibitor is 10 ppm to 10,000 ppm, based on the weight of reactive acrylic monomer used in the curable silicon containing polyacrylate hardcoat composition.

Some of the alkoxysilylacrylates which can be used in the practice of the method of the invention are shown by the following formula,

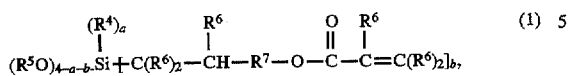

where R4 is a C(1-13) monovalent organic radical, R5 is a C(1-8) alkyl radical, R6 is selected from hydrogen, R4, radicals or mixtures thereof, R7 is a divalent C(1-8) alkylene radical, a is a whole number equal to 0–2 inclusive, b is an integer equal to 1–3 inclusive, and the sum of a+b is equal 1–3 inclusive.

Included within the alkoxysilylacrylates are compounds having the formulas:

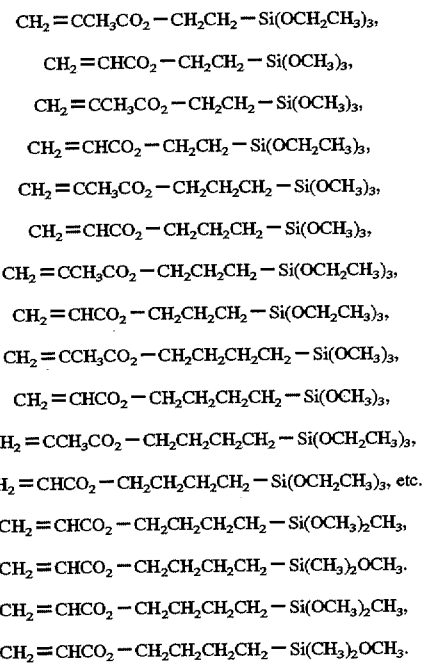

Among the polyfunctional reactive acrylic monomers which can be used in the practice of the method of the invention, are compounds shown by the formula,

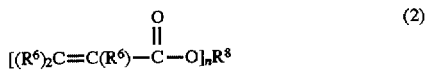

where $R^6$ is as previously defined, $R^8$ is a polyvalent organic radical and n is an integer having a value of 2 to 4.

Some of the reactive acrylic monomers which can be used are for example,

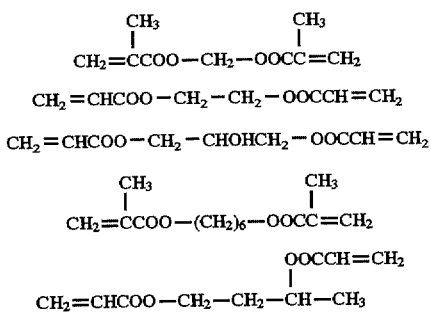

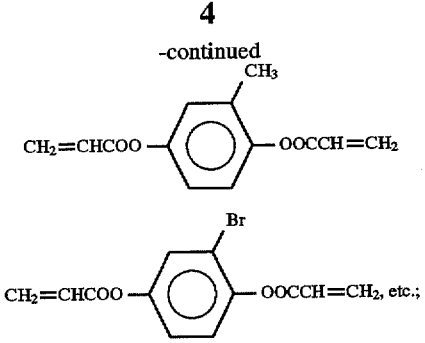

Silicone ester acrylate oligomer (EBECRYL 350, UCB Radcure Inc.) aliphatic urethane diacrylates triacrylates of the formulas,

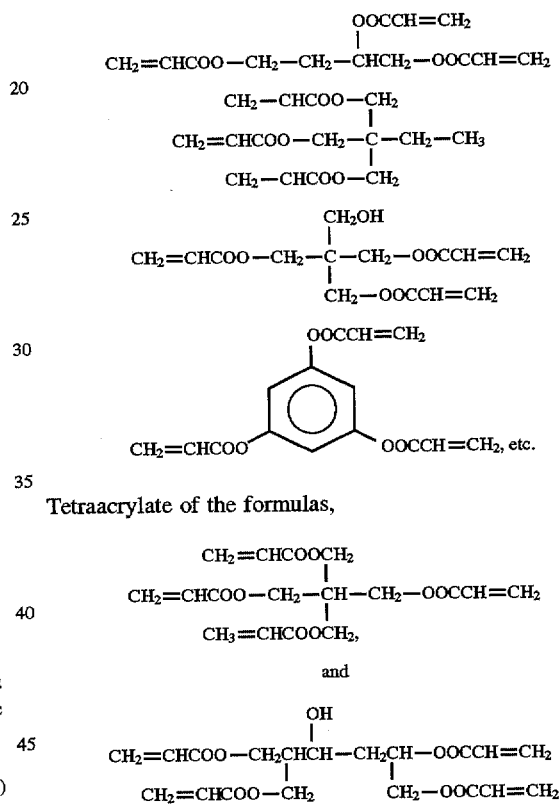

Additional acrylates having at least 3 or more reactive groups are dipentaerythritol monohydroxypenta acrylate, hexafunctional polyurethane acrylate, and silicone acrylate oligomer (Ebecryl 1360, UCB Radcure Inc).

The coating compositions made in accordance with the present invention can contain one or more of the polyfunctional reactive acrylic monomers. Preferably a mixture of two polyfunctional reactive acrylic monomers can be used and in particular a diacrylate and a triacrylate. In addition, minor amounts of a monoacrylate also can be used in combination thereof in particular instances. Further, the curable compositions made by the method of the present invention, can be UV curable or electron beam curable. These compositions can contain nonacrylic UV curable unsaturated organic monomers in amounts up to 50% by weight of the UV curable hardcoat compositions. There are included, for example, such materials as N-vinyl pyrrolidone, styrene, etc.

When the coating compositions made by the present invention contain a mixture of acrylic monomers, it is preferred that the ratio, by weight, of the diacrylate to the polyfunctional, such as trifunctional acrylate be from about 10/90 to about 90/10. Some of the mixtures of diacrylate and triacrylates which can be used in the practice of the invention, include mixtures of hexanediol diacrylate with pentaerythritol triacrylate, hexanediol diacrylate and trimethylolpropane triacrylate, dietheyleneglycol diacrylate with pentaerythritol triacrylate, and diethyleneglycol diacrylate with trimethylolpropane triacrylate.

While coatings may likewise contain the ultraviolet light reaction product of a single polyfunctional acrylic monomer, coatings which contain the photoreaction product of two polyfunctional acrylic monomers, are preferably the product of a diacrylate and triacrylate.

The photocurable coating compositions also can contain a photosensitizing amount of photoinitiator, i.e., an amount effective to effect the photocure in air or an inert atmosphere, for example, nitrogen, of the coating composition. Generally, this amount is from about 0.01% to about 10% by weight, and preferably from about 0.1% to about 5% by weight of the photocurable coating composition.

Photoinitiators which preferably can be used in a nonoxidizing atmosphere, such as nitrogen, are those selected from the group consisting of:

benzophenone and other acetophenones, benzil, benzaldehyde and O-chlorobenzaldehyde, xanthone, thioxanthone, 2-chlorothioxanthone, 9,10-phenanthrenenquinone, 9,10-anthraquinone, methylbenzoin ether, ethylbenzoin ether, isopropyl benzoin ether, 1-hydroxycyclohexyphenyl ketone, α,α-diethoxyacetophenone, α,α-dimethoxyacetoophenone, 1-phenyl-1,2-propanediol-2-o-benzoyl oxime, 2,4,6-trimethylbenzoyldiphenyl phosphine oxide, and, α,α-dimethoxy-α-phenylacetopheone.

The coating compositions made in accordance with the instant invention may also optionally contain UV absorbers or stabilizers such as resorcinol monobenzoate, 2-methyl resorcinol dibenzoate, etc. In addition, other UV absorbers are benzophenones, benzotriazoles, cyanoacrylates and triazines. The stabilizers including hindered amine can be present in an amount, based upon the weight of the coating composition, exclusive of any additional solvent which may optionally be present, of from about 0.1 to 15 weight percent, and preferably from about 3 to about 15 weight percent.

The coating compositions made by the method of the present invention may also optionally contain various flatting agents, surface active agents, mar resistant additives, thixotropic agents, UV light stabilizers and dyes. Various surface-active agents, also may be used in the coating compositions made by the method of the invention and include anionic, cationic and nonionic surface-active agents. The materials are described in Kirk-Othmer Encyclopedia of Chemical Technology, Vol. 19, Interscience Publishers, New York, 1969, pp. 507–593, and Encyclopedia of Polymer Science and Technology, Vol. 13, Interscience Publishers, New York, 1970, pp. 477–486, both of which are incorporated herein by reference.

Suitable thermoplastic substrates which can be utilized in the practice of the present invention to produce shaped thermoplastic articles having enhanced abrasion resistance are, for example, Lexan polycarbonate, Valox polyester, Mylar polyester, Ultem polyetherimide, PPO polyphenyleneoxide, and polymethylmethacrylate. Additional substrates such as wood, metals such as steel and aluminum, and metallized thermoplastics also can be used.

In order that those skilled in the art will be better able to practice the present invention, the following example is given by way of illustration and not by way of limitation. All parts are by weight.

EXAMPLE 1

A mixture was heated at 60°–70° C. for 2 hours consisting of 99 g of a mixture of colloidal silica in isopropyl alcohol having a pH of 3–5 containing 30% $SiO_2$, 13 g of methylacryloxypropyltrimethoxysilane and 0.2 g of galvinoxyl. After heating, 36.2 g of hexanedioldiacrylate was added and the mixture was stripped under vacuum (30 torr) with a nitrogen bleed. There was obtained 76 parts of a radiation curable purple oil having a viscosity of 56.5 cps.

A blend of 10 g of the purple oil, 10 g of trimethylolpropanetriacrylate, 1.2 g of Vicure® 55, methylbenzoyl formate of Akzo Chemical Co., and 30 g of isopropanol was flow coated onto a polycarbonate substrate and UV cured in air at 20 ft./min. The cured coating was found to be abrasion resistant as shown by the steel wool rub test and it had a yellowness index of 0.8.

The above procedure was repeated except that 99 g of a colloidal silica methanol mixture having 30% by weight of $SiO_2$, 13 g of methylacryloxypropyltrimethoxysilane, and 0.2 g of galvinoxyl were heated for 1 hour at 65° C. There was then added 36.2 g of hexanedioldiacrylate and the solution was stripped. A yellow gel was obtained.

The above procedure using the colloidal silica methanol mixture was repeated except that about 30% by weight of isopropanol was added to the mixture prior to stripping. There was obtained an radiation curable oil having a viscosity of 146 cps.

EXAMPLE 2

A mixture was heated consisting of 520 g of IPAST of Nissan Chemicals (a low pH mixture of 156 g of $SiO_2$ in isopropanol having about 14.9 g of water), 68.3 g of methylacryloxypropyltrimethoxysilane, and 0.75 g of 4—OH TEMPO. The mixture was heated to 83° C. for 3 hrs. and allowed to cool to room temperature. There was then added 183.1 g of hexanedioldiacrylate. While bubbling nitrogen through the mixture, the mixture was stripped at 30 torr for 1 hour at ambient temperatures. After one hour of stripping, the pot temperature rose to 63° C. There was obtained 412.2 g of a radiation curable oil having a viscosity of 53 centipoise.

Although the above examples are directed to only a few of the many variables which can be used in the practice of the method of the present invention, it should be understood that the present invention is directed to a method for making a much broader variety of radiation curable silicon containing polyacrylate compositions and methods for making as set forth in the description preceding these examples.

What is claimed is:

1. A method for making a curable silicon-containing composition comprising removing volatiles, at a temperature of 25°–100° C. and a pressure of 1–760 torr, from a silicon-containing polyacrylate mixture comprising by weight, (A) 100 parts of the product of reaction at a temperature of about 20°–100° C. of a mixture of (i) about 5–20% by weight of alkoxysilylacrylate having the formula

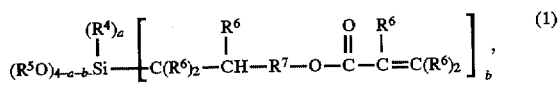

where $R^4$ is a $C_{1-13}$ monovalent organic radical; $R^5$ is a $C_{1-8}$ alkyl radical; $R^6$ is selected from hydrogen and $R^4$; $R^7$ is a $C_{1-8}$ alkylene radical; a is an integer equal to 0–2 inclusive; b is an integer equal to 1–3 inclusive; and a+b is 1–3; and (ii) correspondingly about 80–95% by weight of a colloidal silica alcoholic dispersion consisting essentially of colloidal silica, water in an amount sufficient to hydrolyze said alkoxysilylacrylate and no greater than 5% by weight of said product and a $C_{3-5}$ branched aliphatic alcohol selected from the group consisting of

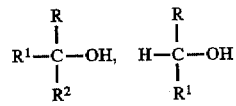

wherein each of R, $R^1$ and $R^2$ is independently methyl or ethyl, or a mixture of said $C_{3-5}$ branched aliphatic alcohol and a $C_{1-5}$ straight chain alcohol, where the colloidal silica is present in said dispersion at about 5–70% by weight;

(B) about 10 to about 400 parts of at least one polyfunctional reactive acrylic monomer and (C) an effective amount of gelation inhibitor.

2. A method in accordance with claim 1 wherein the alcohol is isopropanol.

3. A method in accordance with claim 1 wherein the alcohol is a mixture of methanol and isopropanol.

4. A method in accordance with claim 1 wherein the gelation inhibitor is anaerobic.

5. A method in accordance with claim 4 wherein the gelation inhibitor is galvinoxyl.

6. A method in accordance with claim 4 wherein the gelation inhibitor is 4-hydroxy-2,2,6,6-tetramethylpiperidinyloxy.

7. A method in accordance with claim 4 wherein the gelation inhibitor is bis(2,2,6,6-tetramethyl-4-piperidinyloxy)sebacate.

8. A method in accordance with claim 1 wherein the alkoxysilylacrylate is methacryloxypropyltrimethoxysilane.

9. A method in accordance with claim 1 wherein the polyfunctional reactive acrylic monomer is hexandiol diacrylate.

* * * * *